April 13, 1948. W. A. BANIGAN 2,439,710
COLLAPSIBLE WILD FOWL DECOY
Filed Feb. 9, 1945 2 Sheets-Sheet 1
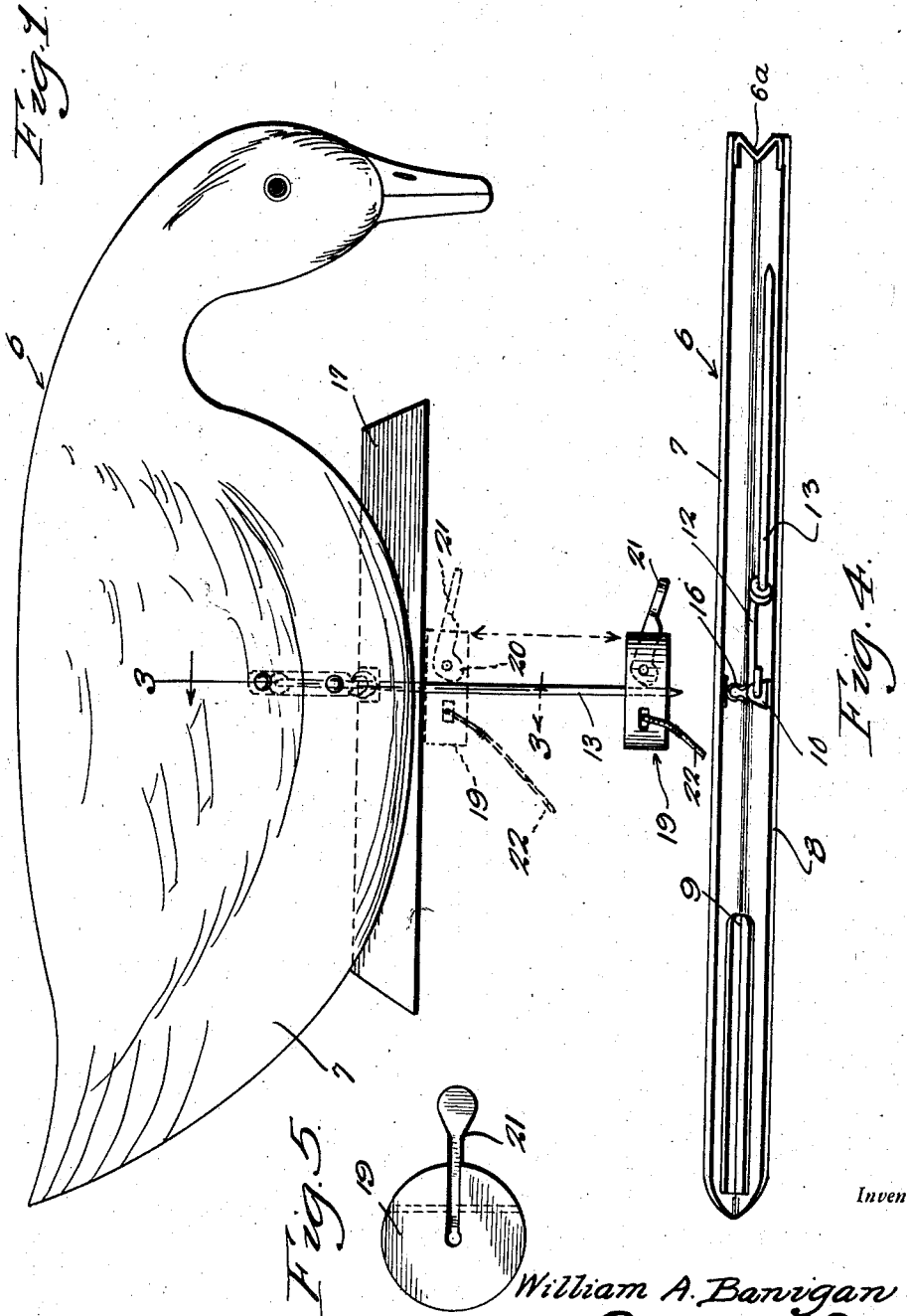
Inventor
William A. Banigan
By Clarence A. O'Brien
and Harvey B. Jacobson
Attorneys April 13, 1948.  W. A. BANIGAN  2,439,710
COLLAPSIBLE WILD FOWL DECOY
Filed Feb. 9, 1945  2 Sheets-Sheet 2
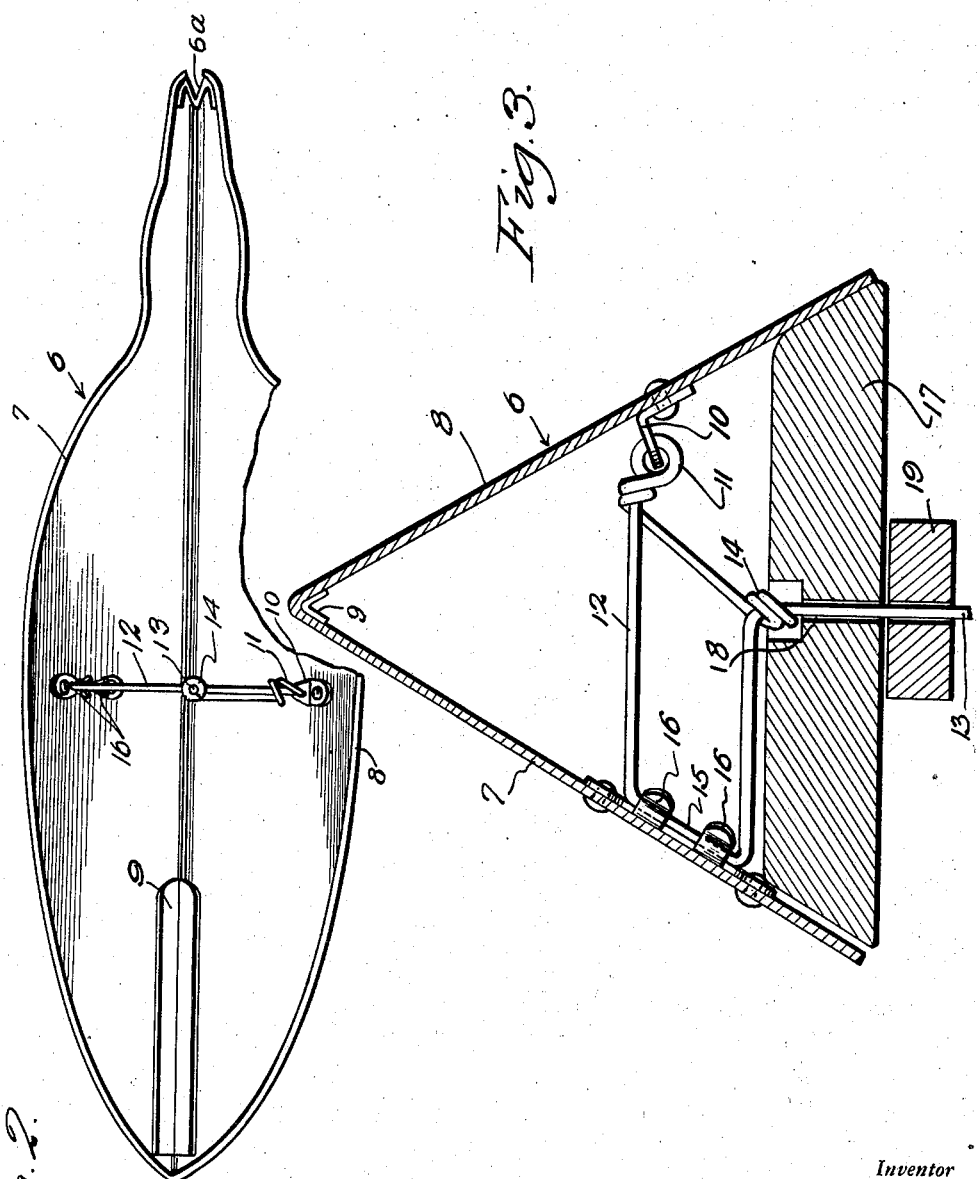
Inventor
William A. Banigan
By Clarence A. O'Brien
and Harvey B. Jackson
Attorneys Patented Apr. 13, 1948

2,439,710

UNITED STATES PATENT OFFICE 2,439,710

COLLAPSIBLE WILD FOWL DECOY

William A. Banigan, Redding, Calif.

Application February 9, 1945, Serial No. 577,061

4 Claims. (Cl. 43—3)

This invention relates a collapsible wild fowl decoy for use by sportsmen, particularly hunters, and the purpose of the invention is to generally, specifically and otherwise improve upon similarly constructed collapsible decoys presently known to me.

In carrying out the preferred principles of the invention, I have perfected a decoy characterized by strength, durability, ease of handling, folding and carrying, and which is possessed of such other desirable prerequisities as unusual simplicity and economy from the standpoint of manufacture and sale.

Briefly, the preferred embodiment of the invention is characterized by a foldable cardboard or equivalent body, this of appropriate configuration and external design, said body being foldable into duplicate half-sections, one half-section being provided with a pivotally mounted frame, the other half-section with clips for holding the frame, and said frame being in turn provided with an extension constituting, under certain circumstances, an anchoring stake. The latter is also usable as a depending pin, this to accommodate a float or pontoon as well as an adjustable counterweight.

Novelty is predicated upon the idea of a convertible stake or pin permitting the device to be used on dry land in one instance, and then converted and used on water, this by simply slipping the float up on said pin and between the foldable half-sections or sides of said body.

Novelty is also predicated upon the idea of the depending pin and the counterweight, said counterweight being adjustable and provided with a line or cord for convenient anchoring of the decoy as a unit.

What is more, limited novelty is predicated upon the specific construction of the frame on the upper end of the pin or rod which serves to spread and hold the aforementioned half-sections of the body in diverging or spread relationship.

Other features and advantages will become more readily apparent from the following description and the accompanying illustrative drawings.

In the drawings, wherein like numerals are employed to designate like parts throughout the views:

Figure 1 is a side elevational view of a collapsible decoy constructed in accordance with the principles of the present invention.

Figure 2 is a bottom plan view with certain of the parts removed for clearness of illustration of the parts.

Figure 3 is an enlarged central vertical section, partly in elevation, this on the plane of the line 3—3 of Figure 1, looking in the direction of the arrows.

Figure 4 is a bottom plan view, like Figure 2, but showing the decoy folded or collapsed, for carrying.

Figure 5 is a bottom plan view of the detachable and adjustable counterweight.

Referring to the drawings by distinguishing reference numerals, the body, as a unit, is denoted by the numeral 6. It is preferably constructed from waterproof stock, for example, suitably treated cardboard. It is cut out and painted to represent a duck or other wild fowl. In the drawings I have adopted a wild duck. Said body comprises a pair of symmetrical half-sections 7 and 8, and, if desired, these may be reinforced where necessary, as for example, at the point 9 in Figure 2.

As seen in Figure 3, I provide a substantially L-shaped bracket or fixture on one of the half-sections 8, said bracket being denoted by the numeral 10 and serving to accomodate a twisted eye 11 formed on one end of the substantially rectangular adapter and spreader frame 12. This frame is formed on the upper end of a wire rod 13 of appropriate length and dimensions. The free end of the wire, forming the frame, is twisted around the rod, as indicated at 14. That end portion of the frame denoted by the numeral 15 serves as a detent, and this is releasably engageable with spring clips 16 mounted on the other half-section 7 and serving as suitable keepers.

The numeral 17 designates a wooden or equivalent buoyant pontoon or float, this being generally ovate in form and centrally bored, as indicated at 18, to permit it to be slipped up and down on the rod 13. When the decoy is used in the water, it floats and the float 17 keeps it in an upright floating position. When used on the ground, that is, off shore, the float can be slipped down on the rod and based on the ground to facilitate balancing the decoy.

I also provide a collar-like weight 19 which serves as a counterweight. This is centrally bored and also is slidably adjustable on said rod 13. Moreover, it is provided with a cam 20 having a finger piece 21 for convenient actuation purposes. The cam is engageable with the rod and thus the counterweight can be locked on the rod in different positions. When the decoy is used in the water, the counterweight is adjusted to the desired elevation to prevent it from being easily blown over by strong winds.

When the device is in use, as shown in Figure 3, the frame 12 is arranged between the half-sections 7 and 8 and is fastened in place, as illustrated. This serves to spread the parts 7 and 8 for suitable companion coaction with each other. The float 17 is also put in place, as shown, and the weight 19 is adjusted to the desired elevation, depending on the judgment of the user. If desired, the counterweight 19 may be provided with an anchor-equipped cord or line 22, this being an optional feature. That is to say, said cord 22 can be suitably attached to the weight 19, the float 17, or to the rod 13 (as shown), depending on requirements.

In addition to the reinforcing insert or patch 9, a similarly functioning patch is employed in the head, neck and bill portion to permit complete collapsing of the walls 7 and 8 while at the same time allowing said walls to spread sufficiently to take the positions seen in Figures 1, 2 and 3. More specifically, a substantially V-shaped insert forming a web 6a is glued in place between the half-sections at the head and bill ends of same; and, as indicated, this is of a nature to allow the necessary expandable and foldable properties. The fact that the element 6a is of an incidental nature it is not detailed in the drawings, or explained with unusual explicitness here.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A collapsible wild fowl decoy of the class described comprising a foldable body composed of duplicate half-sections movable toward and from each other and hingedly connected together, and a frame pivotally attached to the inner surface of one of said half-sections, the other half-section being provided with keeper clips, said frame being releasably engaged with said keeper clips, and said frame being provided with a depending rod, said rod serving as an anchoring stake.

2. A collapsible wild fowl decoy of the class described comprising a foldably collapsible cardboard body of predetermined configuration embodying a pair of duplicate half-sections hingedly connected together and swingable toward and from each other, and an open wire frame pivotally attached at one end to an inner surface of one of said half-sections, the other half section being provided on its inner surface with keeper clips, the adjacent end of said frame being releasably engageable with said keeper clips, said frame constituting a spreader and retainer for the half-sections and including an integral depending rod, said rod serving in one instance as an anchoring stake, and serving in the second instance as a supporting and accommodating pin for a detachable float.

3. A collapsible wild fowl decoy of the class described comprising a foldably collapsible cardboard body of predetermined configuration embodying a pair of duplicate half-sections hingedly connected together and swingable toward and from each other, an open wire frame pivotally attached at one end to an inner surface of one of said half-sections, the other half-section being provided on its inner surface with keeper clips, the adjacent end of said frame being releasably engageable with said keeper clips, said frame constituting a spreader and retainer for the half-sections and including an integral depending rod, said rod serving in one instance as an anchoring stake, and serving in the second instance as a supporting and accommodating pin for a detachable float, and a bouyant float of general ovate form in outline, said float being in the nature of a centrally apertured wooden block and slidably mounted, by way of said aperture on said pin, the marginal edges of said float being beveled to engage inner surfaces of said half-sections, the bottom of the float being flat to facilitate use of the float as a base under certain predetermined circumstances.

4. A collapsible wild fowl decoy of the class described comprising a foldably collapsible cardboard body of predetermined configuration embodying a pair of duplicate half-sections hingedly connected together and swingable toward and from each other, an open wire frame pivotally attached at one end to an inner surface of one of said half-sections, the other half-section being provided on its inner surface with keeper clips, the adjacent end of said frame being releasably engageable with said keeper clips, said frame constituting a spreader and retainer for the half-sections and including an integral depending rod, said rod serving in one instance as an anchoring stake, and serving in the second instance as a supporting and accommodating pin for a detachable float, and a collar-like weight detachably and adjustably mounted on said pin beneath the float, said weight being provided with an adjusting and retaining latch, said weight being adapted to accommodate an anchoring line such as is used whenever necessary or desired.

WILLIAM A. BANIGAN.

REFERENCES CITED

The following references are of record in the file of this patent:

UNITED STATES PATENTS

| Number | Name | Date |
| --- | --- | --- |
| 282,851 | Danz | Aug. 7, 1883 |
| 283,195 | Benjamin | Aug. 14, 1883 |
| 1,532,418 | Lewis | Apr. 7, 1925 |
| 1,636,549 | Brown | July 19, 1927 |
| 1,663,009 | Johnson | Mar. 20, 1928 |